(No Model.)
R. DE EICKEN.
ENGINE GOVERNOR.
No. 490,343.
Patented Jan. 24, 1893.
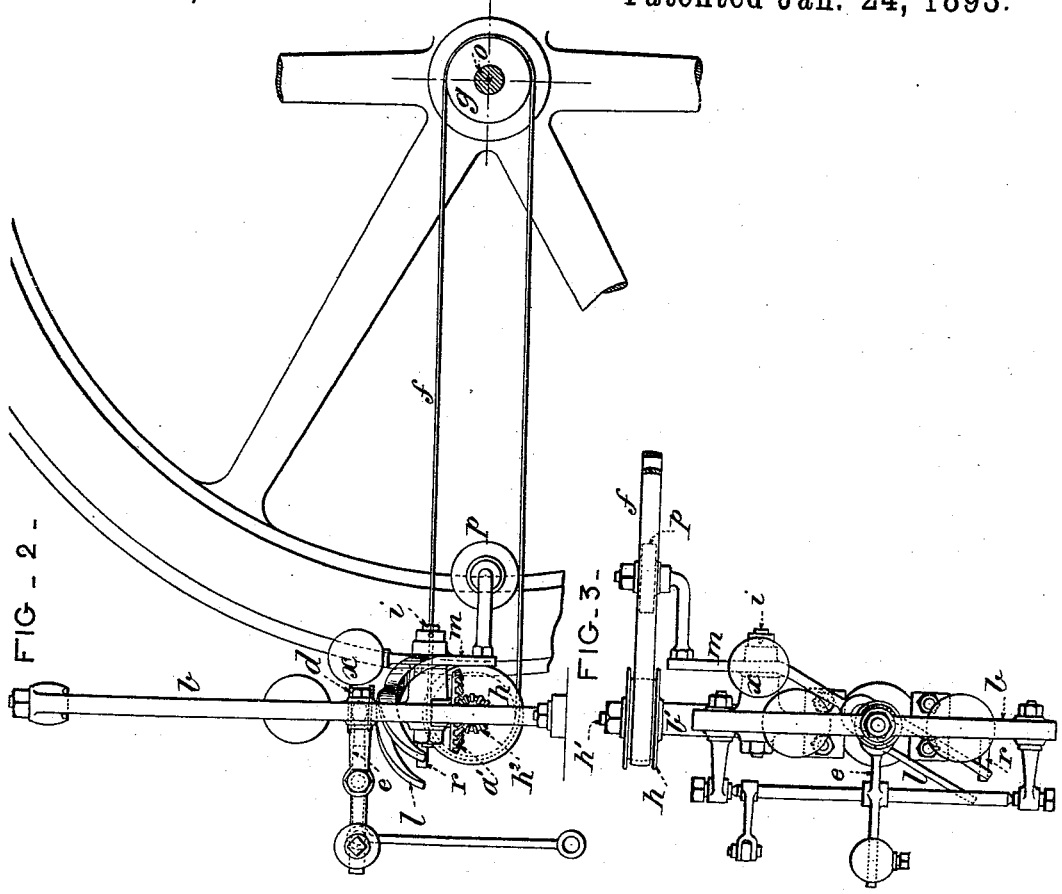
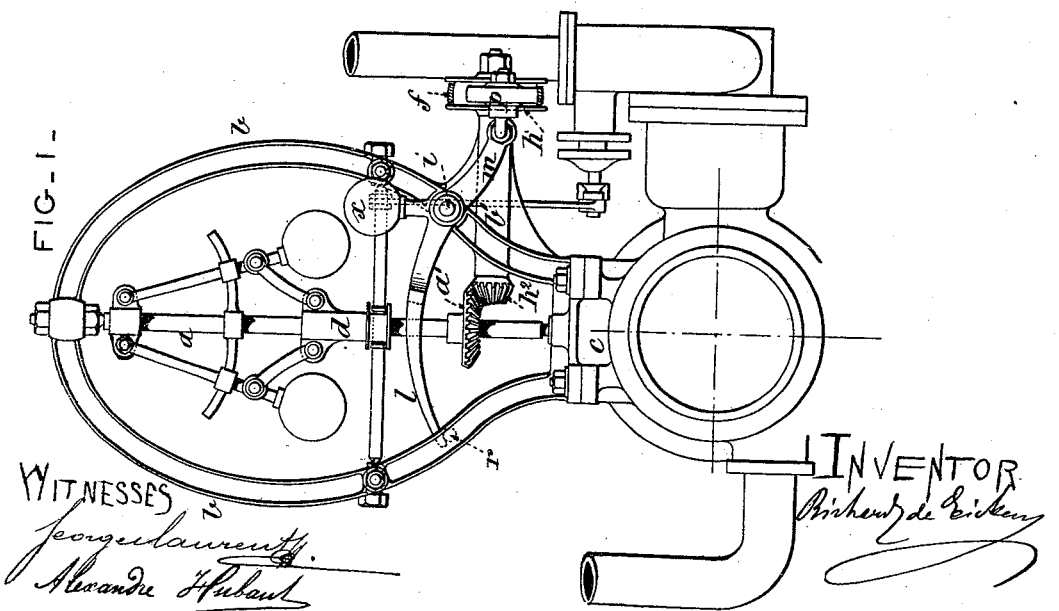
WITNESSES
INVENTOR

UNITED STATES PATENT OFFICE.

RICHARD DE EICKEN, OF PARIS, FRANCE.

ENGINE-GOVERNOR.

SPECIFICATION forming part of Letters Patent No. 490,343, dated January 24, 1893.

Application filed October 12, 1892. Serial No. 448,663. (No model.)

*To all whom it may concern:*

Be it known that I, RICHARD DE EICKEN, civil engineer, residing at Paris, in the Republic of France, have invented a new Safety Appliance for Watt Governors; and I do hereby declare that the following is a full and exact description thereof, reference being made to the accompanying drawings.

My invention relates to a safety-appliance for Watt governors used for steam, gas, or air engines or the like, and has for its object to stop the engine when the connection between it and the governor is broken. The Watt governors, which are used in machines, and more particularly in steam, gas, and air engines and the like, maintain in the proper limits the variations of the speed given to the said engines. They are operated generally from the main shaft by means of a belt, which passes over a wheel on the said main shaft and a second wheel on a shaft the bearings of which are in the governor frame, and which, through beveled gear, operates the vertical spindle to which are attached the governing balls or weights, whereby the said balls or weights are subjected to the centrifugal force, which remains the same with the same speed, and which raises or lowers the said governing balls or weights as the speed of the engine or motor increases or decreases; and it is these upward and downward movements, which decrease or increase the valve or other suitable opening, with which the steam, gas, or air feed pipe is provided. That being so, it will be understood that when the rope or belt, which connects the main shaft with the governor, runs off one of the above-mentioned wheels or gear or is broken, the said governor, left to itself, takes its stationary position, that is to say, the balls or other weights fall down into their lowest position, and throw wide open the valve or other suitable opening in the steam, gas, or air feed pipe of the engine or motor. The result is that the said engine or motor receives the maximum quantity of steam, gas, or air, and begins running at a dangerous speed, which may lead to all kinds of accidents and breakage both in the engine itself and the machines, tools, and the like, which it operates. But this abnormal running of the engine will last as long as the engine driver does not come and shut off with his hand the steam, gas, or air in the feed pipe, the said driver not being aware of what has happened until some accident or other may have drawn his attention to it.

My invention has essentially for its object to prevent the defects just mentioned and also, when the connection is broken between the governor and the steam, gas, or air engine, to instantaneously and automatically shut off the steam, gas, or air in the feed pipe of the said engine, and thus bring it to a stop. In this way no accident can occur either to the engine itself or to any part of the workshop.

My invention consists, in principle, in putting, in permanent contact with the connecting rope or belt, a lever which turns on its pivot directly the said rope or belt has been broken and immediately raises to its highest point the sleeve of the governor, whereby the steam, gas, or air is shut off in the feed pipe of the engine.

In the accompanying drawings, which merely demonstrate the appliance, which may, of course, vary according to the particular form of engine or governor: Figure 1 is a front view; Fig. 2 a side elevation; and Fig. 3 a plan of Fig. 1, of my safety-appliance as used for the governor of a steam engine.

As shown in the drawings, the governor has a vertical shaft $a$, which turns in a frame $b$, fixed on the cylinder $c$ of the engine. The sleeve $d$, of the governor, which follows the upward and downward movements of the balls or other weights, operates, through the medium of a weighted and pivoted lever $e$ and intermediate rods, a butterfly opening in the feed pipe in front of the valve-box of the said engine. The shaft $a$ is turned by a belt $f$, which passes over the gear wheel $g$ on the driving shaft $o$ and the gear wheel $h$ on the shaft $h'$, which turns in a long socket $b'$ of the frame; on the shaft $h'$ is a beveled pinion $h^2$, which engages with a beveled wheel $a'$ mounted on the shaft $a$.

The above construction is well-known in all its parts. In a part of the frame is a fixed shaft $i$ on which is pivotally mounted the lever $m$, the forked arm $l$ of said lever embracing the shaft $a$ below the sleeve $d$. On the crank arm of lever $m$ is carried a pulley $p$, intended to turn without friction on a small part of the belt $f$. The lever $m$ is, besides, provided with a weight $x$ and that in such a manner that, in the normal working of the said lever, the weight $x$ has no influence whatever upon it. A stop $r$, in the frame, limits the upward movement of the pulley $p$, by the resistance it offers to the downward movement of the arm $l$, which has sufficient weight for counterbalancing to a great extent the lever $m$.

The operation of the safety-appliance is as follows: If the belt $f$ is broken or has run off either the gear wheel $g$ or the gear wheel $h$, the governor stops, and its sleeve $d$ falls down to its lowest point; but the pulley $p$ descends also by the turning of its pivot $m$, and also the weight $x$ immediately accelerates the action of the lever $m$, in order to force the arm or lever $l$ to oscillate upward, when the said lever $l$ meets at once with the sleeve $d$ and carries it up to its highest position. The almost instantaneous result of the above operation of the safety-appliance is that, by means of the lever $e$ and the intermediately connecting parts, the butterfly opening in the feed pipe has shut off the steam, and that the steam engine stops. That was the object to be attained.

Having now described my invention, I claim—

In combination with a governor and its driving belt a lever having on one end a pulley which turns on the driving belt and a forked arm $l$ on its other end arranged to straddle the governor shaft an arm rigid with the said lever and extending up from the pivotal point thereof a weight on the said arm a sleeve on the said shaft and valve-operating connections whereby the lifting of the said sleeve by the said lever closes the said valve substantially as set forth.

In witness whereof I have hereunto set my hand in presence of two witnesses.

RICHARD DE EICKEN.

Witnesses:
GEORGE LAURENTZ,
ALEXANDRE HUBANT.